(12) United States Patent
Bratkova et al.

(10) Patent No.: US 6,589,450 B1
(45) Date of Patent: Jul. 8, 2003

(54) LIGHT-CONVERTING MATERIAL AND COMPOSITION FOR PRODUCING THE SAME

(75) Inventors: Ljubov Robertovna Bratkova, Russian Federation, Moscow, ulitsa Gubkina 9, kv. 68 (RU); Robert Nikolaevich Schelokov, Moscow (RU)

(73) Assignee: Ljubov Robertovna Bratkova, Moscow (RU)

( * ) Notice: Subject to any disclaimer, the term of this patent is extended or adjusted under 35 U.S.C. 154(b) by 0 days.

(21) Appl. No.: 09/555,104

(22) PCT Filed: Nov. 25, 1997

(86) PCT No.: PCT/RU97/00375

§ 371 (c)(1),
(2), (4) Date: Jul. 28, 2000

(87) PCT Pub. No.: WO99/27006

PCT Pub. Date: Jun. 3, 1999

(51) Int. Cl.[7] .............................. G02B 5/20; F21V 9/04; C09K 11/02

(52) U.S. Cl. ................. 252/584; 252/588; 252/301.36; 252/301.4 P

(58) Field of Search .............................. 252/584, 588, 252/301.36, 301.4 P

(56) References Cited

U.S. PATENT DOCUMENTS

| | | | | |
|---|---|---|---|---|
| 2,664,401 A | * | 12/1953 | McKeag | 252/301.4 P |
| 4,038,204 A | * | 7/1977 | Wachtel | 252/301.4 P |
| 4,081,300 A | | 3/1978 | Willdorf | 156/71 |
| 4,376,183 A | | 3/1983 | Haskell | 524/417 |

FOREIGN PATENT DOCUMENTS

| | | | |
|---|---|---|---|
| CA | 1128228 | | 7/1982 |
| CH | 667463 A5 | | 10/1988 |
| EP | 0142773 | | 11/1983 |
| EP | 0371699 | | 6/1990 |
| FR | 2581071 | | 4/1985 |
| GB | 2158833 | | 1/1988 |
| JP | 53136050 | | 11/1978 |
| JP | 3158103 | | 7/1991 |
| SU | 1381128 | | 8/1981 |
| SU | 1463737 | | 9/1983 |
| SU | 2036217 | | 4/1991 |
| SU | 2047623 | | 7/1992 |
| SU | 2047624 | | 7/1992 |
| SU | 94009874 | | 3/1994 |
| SU | 1552616 | | 5/1996 |
| WO | 85/01945 | * | 5/1985 |
| WO | 9417135 | | 8/1994 |
| WO | 0024243 | | 5/2000 |

OTHER PUBLICATIONS

"Raman Scattering and Luminescence Spectra of Compounds with the Structure of Apatite $Ca_5(PO_4)_3F$ and $Ca_5(PO_4)_3OR$ Activated with $Eu^{3+}$ Ions". Yu. K. Voron'ko, et al., 1991.
Russian Journal Of Inorganic Chemistry, Conditions for the Formation of Hydroxyapatite in the $CaCl_2–(NH_4)_2HPO_4–NH_4OH–H_2O$ System (25° C)., vol. 4, (1992), pp. 443–444.
Chemistry of Rare Elements "Compounds of Rare–Earth Elements", 1983.
Journal of The American Chemical Society, "Synthesis and Fluorescence of Trivalent Lanthanaide Complexes", L.R. Melby et al., Jul. 17, 1964., pp. 5117–5125.
Russian Journal of Inorganic Chemistry, "Physicochemical Investigation of Khibini Apatite and its Comparions to Hydroxyapatite", G.V. Rodicheva et al., Jun. 6, 1995.
The Offical Journal Of the Oxygen Society, "Free Radical Biology & Medicine", William A. Pryor. Kelvin J.A. Davies, 1988, vol. 5., pp. 281–286.
Laser Science and Technology, "Photobiology of Low–Power Laser Therapy", T.I. Karu, 1989.
Physiologia Plantarum. Action of Different Light Qualities on Simultaneous Photosynthesis and Nitrate Assimilation in Wheat Leaves, Volkmar Stoy, 1955.
Plant & Cell Physiol. "Action Spectra for Photosynthesis in Higher Plants", Katsumi Inada. Oct. 3, 1975.
The USSR Academy of Sciences Order Of Lenin Kurnakov Institute of General and Inorganic Chemistry, "Electronic Spectra of Compounds of Rare–Earth Elements", H.C. Kyphakoba, 1981. p. 183.
Bulletin: "Inventions Published Since 1924 Issued 3 Times a Month", Published May 10, 1996, USSR, p. 270.

* cited by examiner

Primary Examiner—Philip Tucker
(74) Attorney, Agent, or Firm—Ostrolenk, Faber, Gerb & Soffen, LLP

(57) ABSTRACT

The present invention relates to a material comprising a matrix, apatite and at least one europium composite compound of the general formula $Me_x^m M_y^3 R_z^n$, wherein $mx+3y=nz$; $Me_x^m=Me_{x'}^{m'}+Me_{x''}^{m''}+\ldots$; $R_z^n=R_{z'}^{n'}+R_{z''}^{n''}+\ldots$; $mx=m'x'+m''x''+\ldots$; $nz=n'z'+n''z''+\ldots$; $x \geq 1.0$ $\geq y \geq 0.01$. Me represents yttrium, lanthanum, cerium, praseodymium, neodymium, samarium, europium, gadolinium, dysprosium, holmium, erbium, ytterbium, aluminum, bismuth, tin, titanium, manganese, calcium, barium, zinc, cadmium, sodium, potassium, rubidium, cesium, R represents oxygen, sulfur, fluorine, bromine, phosphorus, boron, vanadium, molybdenum, tungsten, germanium or compounds thereof, and m and n represent the charge of a Me or R ion, respectively. The composition for the production of the material comprises (wt. %) apatite 0.01–10.0; composite compound. 0.01–10.0, and the balance is a matrix-forming agent, such as, a polymer, a fiber, a glass-forming composition, or lacquer/adhesive-forming substance.

31 Claims, No Drawings

LIGHT-CONVERTING MATERIAL AND COMPOSITION FOR PRODUCING THE SAME

FIELD OF THE INVENTION

The present invention relates to composite materials, in particular to light-transforming materials used in agriculture, medicine, biotechnology and light industry.

BACKGROUND OF THE INVENTION

An object of the invention is to provide a light-transforming material capable of converting UV light into red light and retaining this capability for a long period.

This issue became urgent especially first because of the necessity to protect humans, animals and plants against solar UV radiation as well as against technogenic UV radiation (UV radiation) which, as known, causes skin solar burns and stimulates to the development of oncology diseases including skin melanoma. Secondly, many publications describe favorable effect of the red light, which enhances the activity of catalase, superoxide dismutase and glutathione reductase enzymes (Y. A. Vladimirov et al., "Free Radical Biol. Med.", N5. 1988, p.281–286), that, in turn, decreases the amount of active forms of oxygen that damages the cell, and also intensifies DNA and protein synthesis (T. I. Karu "Photobiology of low-power laser therapy" in V. S. Letokhov et al. "Laser Science and Technology". Harwood Academic Publishers, Chur, Switzerland, 1989), that in turn promotes healing of wounds, and recovery of skin from solar burns. In addition, red radiation (wavelength 600–630 nm) is absorbed most efficiently by chlorophyll-b of a green leaf. Hence, photosynthesis runs faster, green weight of plants grows harvest of greenhouse cultures increases and the period of ripening becomes shorter (Stoy V., Physiol. % and a mPlant., 1955, v. 18, p.963–986; Inada K., Plant and cell physiol., 1976, v.17 p. 355–365; GB 2158833).

Materials are known which contain a matrix and an active additive capable of absorbing UV-radiation (U.S. Pat. No. 4,081,300; JP 53-136050; JP A3-158103 published on Aug. 08, 1991; FR 2419955), or capable of providing proportioned UV-emission (WO 94/17135). As an active additive, the material comprises carbon black and phthalocyanine dyes (JP 53-136050), benzophenone or benzotriazole (FR 2419955), n-t-butyl(phenyl)salicylate or 2-hydroxy-4-metoxybenzophenone (JP A3-158103), the compounds of salicylic, citric and oxalic acids in combination with dyes, e.g. blue or violet (WO 94/17135). The matrix is extruded into the film of thermoplastic polymers (U.S. Pat. No. 4,081,300, JP 53-136050, FR 2419955), or is made of fibrous material (natural or synthetic) (JP A3-158103), or made in the form of plates of thermoplastic polymers (WO 94/17135), or made of nonfibrous material, thread or lacquer (WO 94/17135). A film-like material is intended to be mostly used in agriculture to protect greenhouses and hothouses (U.S. Pat. No. 4,081,300, JP 53-136050, FR 2419955). A textile-like material is designed to be applied while manufacturing roof hoods and awnings (JP A3-158103), and a plate-like material is intended to be employed in making roof hoods, awnings and even roof overlays (WO 94/17135).

Nevertheless, all these material are unable to transform the UV-light into the red light.

A light-transforming material (CH 667463, GB 2158833) is known which contains a matrix and at least one coordination compound of rare-earth metals (europium, samarium, terbium, gadolinium), as an active additive, which provides transformation of UV component of the light into the orange-red spectral range (580–750 nm). The matrix is extruded into the film of thermoplastic polymer. The composition for the production of this material contains an active additive—0.001–5.0 wt. % and a matrix-forming component—95.0–99.99 wt. %. As the matrix-forming component, the composition contains at least one polymer, selected from the group consisting of polyethylene, polypropylene, polyvinyl chloride, polycarbonate (PC), polystyrene, polymethyl methacrylate or their copolymers. This material retains its light-transforming activity for no more than 60 days as the compounds of rare-earth metals used for the production of this material refer to coordination compounds, which can be quickly decomposed under the action of light.

A light-transforming material (RU 2059999) is known which contains a matrix and at least one composite compound, as an active additive, of the general formula $[(La_{1-x}Eu_x)O]_m(Lig)_n$, where Lig is F, Cl, Br, O, S, or Se, which could also transform UV component of light into the orange-red spectral range (580–750 nm). This material is made in the form of film of thermoplastic polymer. The composition for the production of this material contains an active additive, 0.05–1.0 wt. % and a matrix-forming agent, 99.0–99.95 wt. %. The composition contains at least one polymer, as a matrix-producing agent, selected from the group consisting of polyethylene, copolymers of polyethylene and vinyl acetate (EVA) or poly(ethylene terephthalate).

This material is also capable of converting UV component of a spectrum of light source to the red light. This material retains its activity only for no more than 300 days since all oxohalogenides and especially oxoselenides of rare-earth compounds are decomposed in the air and, in particular, in the presence of moisture.

SUMMARY OF THE INVENTION

The main object of the present invention is to prolong the capability of the light-transforming material to convert UV-light into red light under the same intensity of this conversion by enhancing the resistance of an active additive to the action of light, air and moisture.

An other object is to enlarge the arsenal of the substances suitable for manufacturing materials with light-transforming capability.

One more object is to increase the heat-protecting capability of the material.

The foregoing objects of the present invention are achieved by offering the production of the light-transforming material containing a matrix and an active additive converting the UV-light into the orange-red spectral range. In accordance with the invention, as an active additive, this material contains apatite and at least one europium (III) composite compound of the general formula $Me_x^{m}Eu_y^{3}R_z^{n}$, or a mixture thereof with at least one composite compound of either samarium (III), terbium (III), or gadolinium (III), with the general formula for each:

wherein $mx+3y=nz$,

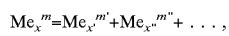

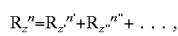

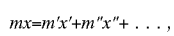

$$nz = n'z' + n''z'' + \ldots,$$

$$x \geq 1.0 \geq y \geq 0.01,$$

Me represents a metal selected from the group consisting of yttrium, lanthanum, cerium, praseodymium, neodymium, samarium, europium, gadolinium, dysprosium, holmium, erbium, ytterbium, aluminium, bismuth, tin, titanium, manganese, calcium, barium, zinc, cadmium, sodium, potassium, rubidium and cesium;

M represents a metal selected from the group consisting of europium, samarium, terbium and gadolinium;

R represents a member selected from the group consisting of oxygen, sulfur, fluorine, chlorine, bromine, phosphorus, boron, vanadium, molybdenum, tungsten, germanium, or a combination thereof; and m and n are the charge of a Me or R ion, respectively.

Herein, the active additive can be distributed inside or over the surface of the matrix.

The material contains an active additive in amounts of at least 0.02 wt. % of the material.

The matrix is made light-transparent.

As apatite, the material comprises natural or synthetic apatite having a crystalline lattice in a finely divided condition, corresponding to the formula $Ca_{10}(PO_4)_6R'_2$ (where R'—F, Cl or OH), or their mixture in any proportions.

The composite compound contains, at least, one composite compound wherein nz=3, R—O, Gal of the formula $Me_xM_yOGal$, Gal is F, Cl, Br; or wherein nz=6, R=O, Hal of the formula $Me_xM_yO_2Hal$, Hal is S or Se; or of the formula $Me_xM_yO_2S_{1\pm0.2}$; or wherein nz=6, R=VO$_4$ of the formula $Me_xM_y(VO_4)_2$; or wherein R—BO$_3$, PO$_4$ of the formula $Me_xM_y(BO_3)_{z'}(PO_4)_{z''}$; or wherein R—VO$_4$, PO$_4$ of the formula $Me_xM_y(VO_4)_{z'}(PO_4)_{z''}$; or wherein R—VO$_4$, PO$_4$, BO$_3$ of the formula $Me_xM_y(VO_4)_{z'}(PO_4)_{z''}(BO_3)_{z'''}$; or wherein R—BO$_2$, WO$_4$, MoO$_4$ of the formula $Me_xM_y(BO_2)_{z'}(WO_4)_{z''}$; or $Me_xM_y(BO_2)_{z'}(MoO_4)_{z''}$; or the mixture of compounds thereof.

Thus, as a compound of the general formula $Me_xM_yOGal$ or $Me_xM_yO_2Hal$, the material comprises the product of processing of solid solutions of Me and M oxides in a medium of alkaline halogenides or halkogenides at 800–1200° C.; as a compound of the general formula $Me_xM_yO_2S_{1\pm0.2}$, the material comprises the product of processing of Me and M oxides in sulfurous medium at 1200° C.; as a compound of the general formula $Me_xM_y(VO_4)_2$, the material comprises the product of interaction of the solid-phase Me and M oxides with ammonium vanadate at 900–1100° C.; as a compound of the general formula $Me_xM_y(BO_3)_{z'}(PO_4)_{z''}$, the material contains the product of interaction of the solid-phase Me and M oxides with boric acid and ammonium phosphate at 900–1100° C.; as a compound of the general formula $Me_xM_y(VO_4)_{z'}(PO_4)_{z''}$, the material comprises the product-of interaction the solid-phase Me and M metal oxides with vanadate and ammonia phosphate at 1000–1200° C.; as a compound of the general formula $Me_xM_y(VO_4)_{z'}(PO_4)_{z''}(BO_3)_{z'''}$, the material contains the product of interaction of the solid-phase Me and M oxides with vanadate and ammonium phosphate as well as boric acid at 800–1100° C.; as a compound of the general formula $Me_xM_y(BO_2)_{z'}(MoO_4)_{z''}$; or $Me_xM_y(BO_2)_{z'}(MoO_4)_{z''}$, the material comprises the product of interaction of the solid-phase Me and M oxides, tungsten (molybdenum) and boric acid at 1100–1200° C.

The material can comprise in addition, at least, one coordination compound of metal E, selected from the group consisting of [E(TTA)$_3$(Phen)], [E(TTA)$_3$(TPhPO)$_2$], (DPhG)H[E(TTA)$_4$], (DPhG)H[E(HFAA)$_4$], [E(HFAA)$_3$(Phen)], [E(HFAA)$_3$(TPhPO)$_2$], (DPhG)H[E$_4$(AA)$_4$], [E(AA)$_3$(Phen)], [E(BB)$_3$(Phen)], [E(TFA)$_3$(Phen)], (DPhG)H[E(TFA)$_4$], [E(Capr)$_3$(Phen)], [E$_2$(Ter)$_3$(Phen)$_2$], [E(NO$_3$)$_3$(Phen)$_2$], E represents a metal selected from group consisting of europium, samarium, terbium, and gadolinium; H represents hydrogen ion; TTA represents thenoyltrifluoroacetonato-anion, HFAA represents hexafluoroacetylacetonato-anion, BB represents benzoylbenzoato-anion, AA represents acetylacetonato-anion, TFA represents trifluoroacetato-anion, Capr represents capronato-anion. Ter represents terephtalato-anion, Phen represents 1.10-phenantrolyne, TPhPO represents triphenylphosphine oxide, DPhG represents diphenylguanidine.

As a coordination compound of metal E, the material can comprise the product of transformation of europium (II), samarium (III), terbium (III) or gadolinium (III) nitrate and thenoyltriflouracetone, hexafluoracetylacetone, or acetylacetone, benzoylbenzoic or trifluoroacetic, caproic, or terephthalic acid and 1,10-phenantroline, or triphenylphosphine oxide, or diphenylguanidine in aqueous-alcoholic medium at 80–90° C.

The material can contain a matrix in the form of film, plate, or cloth textile or non-fibrous/fibrous material.

The matrix can be made of thermoplastic polymers.

The matrix can be made of soluble polymers.

The matrix can be made of polyester selected from the group consisting of polymethyl methacrylate, polybutylmethacrylate, polycarbonate(PC), poly(ethylene terephthalate) and their derivatives, or polyolefin selected from the group consisting of polypropylene, polyvinylchloride, polystyrene, polyethylene and their derivatives, polyamide or its derivatives; or copolymer of these polymers, or mixtures of these polymers.

The matrix can be made of fibrous material (natural including cotton, silk, wool, hemp, and their mixtures or synthetic including viscose, acetate, capron, nylon, polyamide, polyester, their copolymer, and their mixture, or a blend hereof), or a mixture of fibrous material thereof.

The matrix can be made of silicate or a modified silicate glass.

The matrix can be made of organic glass.

The material can comprise in addition lacquer or adhesive.

As lacquer or adhesive, the material can contain a silicone, polyester, polyepoxy, epoxy resin or a mixture thereof.

The objects outlined are also achieved by offering the composition for producing a light-transforming material with the involvement of a matrix-forming agent and an active additive. As an active additive, the composition contains apatite and at least one europium (III) composite compound of the general formula $Me_x'''Eu_y^3R_z''$, or a mixture thereof, at least with one composite compound of samarium (III), terbium (III), or gadolinium (III), with the general formula for each:

$$Me_x'''M_y^3R_z'',$$

wherein $mx30\ 3y=nz$, $$Me_x''' = Me_{x'}''' + Me_{x''}''' + \ldots,$$

$$R_z'' = R_{z'}'' + R_{z''}'' + \ldots,$$

$$mx = m'x' + m''x'' + \ldots,$$

$$nz=n'z'+n''z''+\ldots,$$

$$x\geq 1.0\geq y\geq 0.01,$$

where Me represents a metal selected from the group consisting of yttrium, lanthanum, cerium, praseodymium, neodymium, samarium, europium, gadolinium, dysprosium, holmium, erbium, ytterbium, aluminium, bismuth, tin, titanium, manganese, calcium, barium, zinc, cadmium, sodium, potassium, rubidium, and cesium;

M represents the metal selected from the group consisting of europium, samarium, terbium, gadolinium;

R represents an element selected from the group consisting of oxygen, sulfur, fluorine, chlorine, bromine, phosphorus, boron, vanadium, molybdenum, tungsten, and germanium, or compounds thereof, and m and n are the charge of a Me or R ion, respectively.

As a matrix-forming agent, this composition comprises a thermoplastic or soluble polymer, or fibrous material (natural, synthetic, or mixed), or the composition for the production of organic, silicate, or a modified silicate glass or lacquer/adhesive-forming substance, in the following proportion of the components (wt. %):

| | |
|---|---|
| Apatite | 0.01–10.0 |
| Composite compound | 0.01–10.0 |
| Matrix-forming agent | the balance. |

The composition can contain in addition, at least one coordination compound of metal E, selected from the group consisting of:

$[E(TTA)_3(Phen)]$, $[E(TTA)_3(TPhPO)_2]$, $(DPhG)H[E(TTA)_4]$, $(DPhG)H[E(HFAA)_4]$, $[E(HFAA)_3(Phen)]$, $[E(HFAA)_3(TPhPO)_2]$, $(DPhG)H[E_4(AA)_4][E(AA)_3(Phen)]$, $[E(BB)_3(Phen)]$, $[E(TFA)_3(Phen)]$, $(DPhG)H[E(TFA)_4]$, $[E(Capr)_3(Phen)]$, $[E_2(Ter)_3(Phen)_2]$, $[E(NO_3)_3(Phen)_2]$ in the following proportion of the components (wt. %)

| | |
|---|---|
| Apatite | 0.01–10.0 |
| Composite compound | 0.01–10.0 |
| Coordination Compound | 0.01–1.00 |
| Matrix-forming agent | the balance. |

As the matrix-forming agent, the composition can contain polymer selected from the group consisting of poly(methyl methacrylate), polybutylmethacrylate, polycarbonate (PC), poly(ethylene terephthalate), polypropylene, polyvinyl chloride, polystyrene, polyethylene, polyamide, derivatives of these polymers, copolymer of these polymers, or the mixture of polymers thereof.

As a matrix-forming agent, the composition can also contain a composition for producing silicate or a modified silicate glass.

As lacquer/adhesive-forming agent, the composition can contain a silicone, polyester, polyepoxy, epoxy resin or their mixture.

As a natural fibrous material, the composition can contain fiber selected from the group consisting of silk, wool, cotton, hemp or their mixture.

As a synthetic fibrous material, the composition can contain fiber selected from the group consisting of viscose, acetate, polyester, polyamide, polyacrylamide or their mixture.

To clarify the essence of the present invention we consider the general formula of composite compounds of rare-earth metals—phosphors, as an additive, and included into the material offered:

$$Me_x^m M_y^3 R_z^n,$$

wherein $mx+3y=nz,$ $$Me_x^m = Me_{x'}^{m'} + Me_{x''}^{m''} + \ldots,$$

$$R_z^n = R_{z'}^{n'} + R_{z''}^{n''} + \ldots,$$

$$mx = m'x' + m''x'' + \ldots,$$

$$nz = n'z' + n''z'' + \ldots,$$

$$x \geq 1.0 \geq y \geq 0.01$$

m and n are the charge of a Me or R ion, respectively.

This formula reflects a structure of composite compound including the ion-activator—Me, fluorescent center—ion M, and also an anionic part of the compound—R, which compensate a positive charge of Me and M, where m and n are the charge of a Me and R ion, respectively.

It is necessary to point out that the composite compounds, offered as active additives, are heteropolynuclear complexes, where ion-activator—Me and fluorescent center—M interacts via bridge groups—R. The latter gives rise a concept of "solid solutions", as just in solid solutions the formation of heteropolynuclear compounds is most possible.

As found (E. F. Kustov, G. A. Bandarkin, E. N. Muravyov, V. P. Orlovsky. "Electronic spectra of rare earth compounds" Ed. By I. V. Tananayev, Science Moscow, 1981, p. 183), heteropolynuclear compounds containing europium (III), provide the brightest fluorescence in the area of 610–630 nm (the most important area for luminescent emission in the red spectral range). Therefore, the formula, which describes an element structure of compounds, offered as an active additive, includes, at least, two types of atoms—Me and M with indices x and y when restricting value $x \geq 1.0 \geq y \geq 0.01$, where M should be, at least, Eu (III).

The necessary condition of suitability of composite compound in object decision-making is the presence of europium (III) ions in it. The minor role is played by compounds of samarium (III), terbium (III), and gadolinium (III).

The ranges of values x and y are determined by the minimum value y=0.01, since when the content of fluorescent center M is less, transformation of UV-radiation is gentle; from experience, the value x=1.0 is minimum.

The anionic part of composite compounds in the formula represented is integrated with the value $R_z$, that can include anions of a various structure and in different proportions: $R_{z'} + R_{z''} + R_{z'''} \ldots + \ldots$ wherein $z = z' + z'' + z''' + \ldots$ For instance, the structure of the known composite compound—phosphor of yttrium-europium vanadate phosphate is described by the formula $Y_x Eu_y (PO_4)(VO_4)$, where:

$$Me - Y_x^3, \ M - Eu_y^3. \ R = (PO_4)_1^{3-} + (VO_4)_1^{3-};$$

$$nz = 1 \times 3 + 1 \times 3 = 6;$$

wherein $x=1.9$ $mx=3\times1.9=5.7;$ $y=0.1$, $3y=3\times0.1=0.3$, hence, $mx+3y=5.7+0.3=6.$ The situation is also the same for the compound with formula $Ba(Gd)_{1.9}Eu_{0.1}(WO_4)_4$ where:

$Me_x''' = Me_{x'}''' + Me_{x''}''' = Ba_1^{2+} Gd_{1.9}^3$, $M_y = Eu_{0.1}^3$, $(WO_4)_4^{2-}$;

$z=4$, $n=2$, $nz=4 \times 2=8$;

wherein $x'=1$, $x''=1.9$, $m'=1.0$, $m''=3.0$;

$mx = m'x' + m''x'' = 2 \times 1 + 3 \times 1.9 = 2 + 5.7 = 5.7$;

wherein $y=0.1$, $3y=3 \times 0.1=0.3$, hence $mx+3y=7.7+0.3=8.0$ and, therefore, $mx+3y=nz$.

Thus, the proposed formula of heteropolynuclear compounds appears to be most complete for the description of compounds (phosphors) structure among those we selected to achieve our technical outcome.

As found experimentally, the use of apatite (natural or synthetic with mean grain composition of 4–5 μm) as an active additive, on the one hand, retains for a long period a fluorescence capability of composite compounds included in a structure of a light-transforming material, and on the other hand, enhances heat-particular features of the material, reinforces it and prolongs its service.

In addition, we revealed that combination of apatite and composite compound promotes an increased emission power in green and cyan spectral range.

The (heteropolynuclear) compounds of europium (III), samarium (III), terbium (III) and gadolinium (III), obtained by the method of solid-phase high-temperature synthesis, are thermally rather stable. Combination with natural or synthetic apatite makes these compounds suitable to be included in a structure of high melting organic polymers, for instance, poly(ethylene terephthalate) or polycarbonate (PC).

Coordination compounds of europium (III), samarium (III), terbium (III), and gadolinium (III) are used as extra component of an active additive since they provide bright luminescence in the green and orange-red spectral range, are soluble in a polymer (with the exception of nitrates and terephtalate) and, due to absorbing the UV-component of a sunlight they promote the prolonged action of composite compound—phosphor.

The necessary and sufficient content of apatite, composite compound and coordination compound of rare earths in the material proposed is selected experimentally.

The content of apatite and composite compound in the material less than 0.01 wt. % of each additive is found to be unefficient, since no technical outcome is achieved. An increase of their concentration up to more than 10.0 wt. % of each accompanies an increased absorption of solar radiation in the material, indistinct transparency of the material if it is light-transparent, and also excessive consumption of active additive without the retaining of light-transforming capability for longer period in the material. Only combination of the said particular features leads to the accomplishment of the object outlined, namely to the prolonged light-transforming capability of the material to convert the UV-light into red light and reinforced heat properties of the material under the same intensity of converting UV-emission into red spectral range.

It is necessary to point out, that a selection of a matrix-forming agent for the production of the material proposed depends upon the field of application of the product made of this material. For instance, if the material is intended to be used for hothouses and greenhouses covering, it is obvious that a matrix should be light-transparent extruded into the film. Here, any known thermoplastic or soluble film-forming polymer, for instance, polymethylmethacrylate, polybutylmethacrylate, polycarbonate (PC), poly(ethylene terephthalate), polypropylene, polyvinylchloride, polystyrene, polyethylene, or polyamide could be used as a matrix-forming agent. The thermoplastic polymer, as a matrix-forming agent, can be used for obtaining a light-transforming material to produce biotechnological equipment, as for instance, Petri dish, test tubes, separating flasks, capillary tubes for cultivation of microorganisms and cell cultures, as well as to produce plates for winter greenhouse protection, fixed solariums and buildings for animals.

The composition for obtaining silicate (or other) glass, as a matrix-forming agent, can be used when the material proposed is intended to be applied, for instance, to glaze houses and office buildings, as well as greenhouses and buildings for animals, or for instance, to make glasses, automobiles, sun-visors and awnings.

Natural and/or synthetic fibers, as a matrix-forming agent, can be employed for obtaining light-transforming textile cloths required for instance, for manufacturing light-protective roof hoods and awnings, and also for producing light-protective clothes. Using artificial and, in particular, synthetic fibres, it is possible to make light-transforming bonded fabric and use it as a protecting material in agriculture.

DESCRIPTION OF THE PREFERRED EMBODIMENT

Apatite (natural or synthetic), europium composite compound and a matrix-forming agent suitable for further application are used to produce the material offered.

As a natural apatite, it is more expedient to use colorless fine-crystalline apatite with mean grain composition of 4–5 μm.

The process of obtaining a synthetic apatite is known and is described in the detail in literature (the method of production of fluoroapatite and hydroxyapatite is described by Yu. K. Voron'ko, A. V. Gorbachov, A. A. Zverev, A. A. Sobol', N. N. Morozov, E. N. Murav'ev, Sh. A. Niyazov and V. P. Orlovskii in the article entitled "Raman Scattering and Luminescence Spectra of Compounds with the Structure of Apatite $Ca_5(PO_4)_3F$ and $Ca_5(PO_4)_3OH$. Activated with $Eu^{3+}$ Jons." Inorganic Materials. 1992, v. 28,[1] 3, p. 442; and by G. V. Rodicheva, V. P. Orlovskii, N. M. Romanova, A. V. Steblevskii, G. E. Sukhanova. Physicochemical Investigation of an Khibini Apatite and Its Comparison to Hydroxyapatite. Russian Journal of Inorganic Chemistry, 1996, v. 41,[1] 5, p. 728; and the obtaining of hydroxyapatite is described by V. P. Orlovskii, Zh. A. Ezova, G. V. Rodicheva, E. M. Koval, G. E. Sukhanova, in their article entitled "Conditions for the formation of hydroxyapatite $CaCl_2(NH_4)_2HPO_4$—$NH_4OH$—$H_2O$ system (25° C.)," Russian Journal of Inorganic Chemistry, 1992, v. 37,[1] 4, p. 443).

The method of obtaining composite compounds as a component of an active additive, is also known (I. A. Bondar et al., "Compounds of rare earth elements, silicates, germanates, phosphates, arsenates, vanadates" series "Chemistry of rare elements", Ed. by I. V. Tananayev, Science, Moscow, 1983, p. 254–257).

The methods of obtaining coordination compounds of europium, samarium, terbium and gadolinium are known and described by L. R. Melby, N. J. Rose, E. Abramson, J. C. Caris, in their article "Synthesis and Fluorescence of some Trivalent Lanthanide Complexes". J. Amer. Chem. Soc., 1964, v. 86, 23. p.5117.

The composite compounds, as a component of an active additive, are obtained by the conventional method of high-temperature synthesis (E. F. Kustov, G. A. Bandarkin, E. N. Muraviov, V. P. Orlovsky, "Electronic spectra of compounds of rare-earth elements" Ed. by I. V. Tananayev. "Science", Moscow, 1981). In accordance with this method, the oxides of europium (III), samarium (III), terbium (III), or gadolinium (III) in combination with the oxide of yttrium (III) (or other metal), are mixed with corresponding components which form an anionic part (R) of the compound, and stand at 1100–1200° C. for several hours. A clinker obtained in this way is then washed, dried and milled.

EXAMPLES

The obtaining of particular complex compounds—phosphors is illustrated by following examples.

Example 1.

Mix 100.0 g of a lanthanum oxide and, 5.7 g of europium oxide, and then add to the mix 37.8 g of vanadate and 48.1 g of ammonium phosphate. The mixture obtained (fusion mixture) is loaded in a glass-carbon container and incinerated at 1200–1250° C. for 4 hours. Then, the container is slowly chilled and discharged. The clinker is leached with de-ionized water and fractionated up to a mean fine structure of 4 $\mu$m. The structure of composite compound corresponds to the formula $La_{1.9}Eu_{0.1}(VO_4)(PO_4)$.

Example 2.

Mix 90.0 g of yttrium oxide and 10.0 g of europium oxide, dissolve the mixture in nitric acid at 95° C., add ammonium oxalate to the solution obtained, chill it to 25° C. and separate by filtrating a homogeneous mixture of yttrium and europium oxalates.

Then, for incineration, prepare a fusion mixture containing a precipitate, 30.0 g of free sulfur, 100.0 g of sodium carbonate and 2.6 g of lithium fluoride. The mixture is put into the glass-carbon container and incinerated at 1220–1260° C. for 4 hours. Then, the container is slowly chilled and discharged. The clinker is leached with de-ionized water and fractionated up to a mean fine structure of 4 $\mu$m. The structure of the composite compound obtained corresponds to the formula $Y_{1.9}Eu_{0.1}O_2S_1$.

Example 3.

Mix 100.0 g of yttrium oxide and 8.2 g of europium oxide, and add 109.1 g of ammonium vanadate to the fusion mixture. The mixture is loaded in the glass-carbon container and incinerated at 900–1100° C. for 4 hours. Then, the container is slowly chilled and discharged. The clinker is leached with de-ionized water and fractionated up to a mean fine structure of 5 pm. The structure of the composite compound obtained corresponds to the formula $Y_{1.95}Eu_{0.1}(VO_4)_2$.

Example 4.

Mix 100.0 g of lanthanum oxide and 5.7 g of europium oxide, and add 48.13 g of ammonium phosphate and 19.96 g of boric acid to the fusion mixture. This mixture is put into the glass-carbon pot and incinerated at 900–1100° C. for 4 hours. Then, the pot is slowly chilled and discharged. The clinker is treated with de-ionized water and fractionated up to a mean fine structure of 4 $\mu$m. The structure of composite compound corresponds to the formula $La_{1.9}Eu_{0.1}(BO_3)(PO_4)$.

Example 5.

As in example 4 but the base mixture contains 100.0 g of yttrium oxide and 8.2 g of europium oxide, 69.5 g of ammonium phosphate and 28.8 g of boric acid. The structure of the composite compound obtained corresponds to the formula $Y_{1.9}Eu_{0.1}(BO_3)(PO_4)$.

Example 6.

Mix 100.0 g of yttrium oxide and 4.0 g of europium oxide. Add 63.8 g of vanadate and 40.6 g of ammonium phosphate, as well as 5.6 g of boric acid to the mixture obtained. The mixture is loaded in the glass-carbon pot and incinerated at 1200–1250° C. for 4 hours. Then, the pot is slowly chilled and discharged. The clinker is treated with de-ionized water and fractionated up to a mean fine structure of 4 microns. The structure of composite compound corresponds to the formula $Y_{1.95}Eu_{0.05}(VO_4)_{1.2}(PO_4)_{0.6}(BO_3)_{0.2}$.

Example 7.

As in example 6 but the base mixture contains 100 g of yttrium oxide and 8.2 g of europium oxide, 54.5 g of vanadate, 48.6 g of ammonia phosphate and 8.6 g of boric acid. The structure of composite compound corresponds to the formula $Y_{1.9}Eu_{0.1}(VO_4)_{1.0}(PO_4)_{0.7}(BO_3)_{0.3}$.

Example 8.

Mix 100.0 g of yttrium oxide and 8.2 g of europium oxide,b and add 108.1 g of tungsten oxide and 28.8 g of boric acid to this mixture. The mix is loaded in the glass-carbon pot and incinerated at 900–1000° C. for 4 hours. Then, the pot is slowly cooled and discharged. The clinker is leached with de-ionized water and fractionated up to a mean fine structure of 4 $\mu$m. The structure of composite compound corresponds to the formula $Y_{1.9}Eu_{0.1}(BO_2)_2(WO_4)_2$.

Example 9.

As in example 8 but the base mixture contains 67.1 g of molybdenum oxide instead of tungsten oxide. The structure of composite compound corresponds to the formula $Y_{1.9}Eu_{0.1}(BO_2)_2(MoO_4)_2$.

Example 10.

Mix 26.1 g of barium nitrate, 65.2 g of gadolinium oxide, 7.0 g of europium oxide, and 43.2 g of molybdenum oxide. The mixture obtained is loaded in the glass-carbon pot and incinerated at 600° C. for 2 hours, and then, at 1100° C. for 2 hours. The pot is slowly cooled and discharged. The clinker is leached with de-ionized water and fractionated up to a mean fine structure of 5 $\mu$m. The structure of the composite compound obtained corresponds to the formula $BaGd_{1.8}Eu_{0.2}(MoO_4)_4$.

Example 11.

Mix 23.0 g of yttrium oxide and of 3.5 g of europium oxide and 0.9 sodium fluoride. The mixture obtained is put in the alundum pot and incinerated at 1100–1200° C. for 4 hours. Then, the pot is slowly chilled and discharged. The clinker is leached with de-ionized water and fractionated up to a mean fine structure of 4 $\mu$m. The structure of the composite compound obtained corresponds to the formula $Y_{0.9}EU_{0.1}OF$.

Example 12.

As in example 2, but the base mixture contains 10.0 g of samarium oxide instead of europium oxide. The structure of the composite compound obtained corresponds to the formula $Y_{1.9}Sm_{0.1}O_2S_1$.

Example 13.

As in example 2, but the base mixture contains 10.0 g of terbium oxide instead of europium oxide. The structure of the composite compound obtained corresponds to the formula $Y_{1.9}Tb_{0.1}O_2S_1$.

Example 14.

As in example 2, but the base mixture contains 10.0 g of gadolinium oxide instead of europium oxide. The structure of the composite compound obtained corresponds to the formula $Y_{1.9}Gd_{0.1}O_2S_1$.

Example 15.

As in example 2, but the base mix contains 32.6 g of a lanthanum, 4.0 g of europium oxides, 15.0 g of free sulfur, 50.0 g of sodium carbonate and 1.3 g of lithium fluoride. The structure of the composite compound obtained corresponds to the formula $La_{1.9}Eu_{0.1}O_2S_1$.

Example 16.

As in example 2, but the base mixture contains 5.6 g of samarium oxide instead of europium oxide. The structure of the composite compound obtained corresponds to the formula $La_{1.9}Sm_{0.1}(BO_3)(PO_4)$.

Example 17.

As in example 2, but the base mixture contains 5.5 g of terbium oxide instead of europium oxide. The structure of the composite compound obtained corresponds to the formula $La_{1.9}Tb_{0.1}(BO_3)(PO_4)$.

The proposed coordination compounds of europium, samarium, terbium and gadolinium were obtained by treating their nitrates with relative acids and bases in aqueous-alcoholic medium at 80–90° C. as illustrated by examples 18–19.

Example 18.

Europium (III) nitrate in an amount as dissolved in 50 ml of ethanol on heating, 8.89 g thenoyltrifluoroacetone in 10 ml of ethanol, and then—8.44 g of diphenylguanidine in 15 ml of ethanol were added and a solution obtained. The solution was cooled, and a precipitate was filtered out. A filtrate stood for free vaporization. The amorphous-crystalline mass obtained has a structure conforming to the formula $(DPhG)H[Eu(TTA)_4]$.

Example 19.

4,46 g of europium (III) nitrate was dissolved in 50 ml of hot water. 3.4 g of 1,10-phenantroline in 10 ml of ethanol was added and a solution obtained. The crystalline deposit precipitated immediately. The solution was cooled. The precipitate was filtered out on a glass porous membrane, washed with cold water, then with ethanol and ester. The structure of the compound obtained corresponds to the formula $[Eu(NO_3)_3(Phen)_2]$.

Examples 1–17 illustrate synthesis of composite compounds available for a commercial production.

The method of producing a light-transforming material containing a matrix and an active additive, wherein a matrix is extruded into the film or plate or obtained from thermoplastic or soluble polymer, resembles the method of obtaining polymer films or sheets described in CH 667463, and GB 2158833.

Example 20.

For producing a light-transforming material, use the composition comprising 99.8 kg of polyethylene granulated, 0.1 kg of natural apatite and 0.1 kg of composite compound of a structure $Y_{1.9}Eu_{0.1}(VO_4)_{1.5}(PO_4)_{0.5}$ in the form of fine powder of a mean dispersed structure of 4 μm as a matrix-forming component. This composition is put in the mixer, then thoroughly stirred and extruded into the film of 100–150 μm.

The material obtained contains a matrix and an active additive—0.1 wt. % of a natural apatite and 0.1 wt. % of the said yttrium-europium vanadate-phosphate. The active additive is distributed in a matrix, extruded into the film.

The optical properties of the material obtained are represented in Table 1: the quantum efficiency of conversion of a sunlight in the range of 280–400 nm is up to 85% light transparency in the range of 580–750 nm is 82%, stability of fluorescence properties is more than 650 days.

This material in the form of transparent film can be used for covering hothouses and greenhouses.

Examples 21–35 are represented in Table 1.

Table 1 illustrates properties of a light-transforming material obtained as described in the example 20, wherein other quantities of composite compounds of different structure and other quantities of natural and/or synthetic apatite are used as an active additive. On comparing the properties of the material produced and analogous properties of the prototype (last line in Table 1, example 36) it is seen that the material may retain a light-transforming capability of conversion of UV-light into the red radiation spectral range up to 650 days with the same intensity of transformation (stability of luminescence).

Examples 37–45 are represented in Table 2.

Table 2 demonstrates properties of a light-transforming material extruded into the film, as described in Example 20, wherein different polymers are used as a matrix-forming agent, and different amounts of complex and coordination compounds of different structure and different amounts of natural and/or synthetic apatite are used as an active additive.

As shown in Table 2, the properties of polymer, used as a matrix-forming agent for producing this material, have no effect on the period of retaining a light-transforming capacity in the material proposed.

Furthermore, it is found out that an addition of a natural and/or synthetic apatite to an active additive strengthens a light-transforming material. For instance, a material containing a matrix made in the form of the film, in particular, of polyethylene, as described in Example 20, and containing natural and synthetic apatites by 0.075 wt. % of each additive as an active additive and containing 0.1 wt. % of $Y_{1.95}Eu_{0.05}O_2S$ as composite compound (Example 26), or containing 0.15 wt. % of a synthetic apatite and 0.1 wt. % of $Y_{1.95}Eu_{0.05}O_2S$ (Example 34) exceeds the prototype in tensile strength by 10% and 2 times exceeds elongation of material at a rupture.

Heat-retaining properties of these materials are shown to be enhanced compare to those of their prototype. For instance, the difference between out-door soil temperature and soil temperature in the greenhouse protected with the material containing an additive compared to their prototype was 2–5° C., while the difference of these temperatures in the case when greenhouses were protected with the material described in Example 26 and 34 reached 7–8° C.

Examples 46–48 are represented in Table 3.

Table 3. shows the properties of a light-transforming plate-like material made of silicate (Examples 46, 47, 48), of a polymethylmethacrylate (Example 47), and polycarbonate glasses (Example 46) with a surface coated in lacquer composition containing an active additive distributed over it. The material made in accordance with Examples 46–48 retained its light-transforming properties for 700 days.

Example 49.

For producing a light-transforming material containing polypropylene as a matrix and and active additive, use complex compound in amounts of 0.1 kg, synthetic hydroxyapatite in amounts of 0.1 kg and 100.0 kg of propylene granules. The material was made using the conventional method. The material made retains its light-transforming properties within 600 days.

Example 50.

For producing a light-transforming material containing cotton fiber as a matrix, use 9.94 kg of cloth impregnated with the mixture of soluble polyurethane and 0.03 kg of synthetic fluoride apatite and 0.03 kg of complex compound. The material retains its light-transforming capacity for 600 days.

Example 51.

For producing a light-transforming textile-like material containing polypropylene as a matrix, use 96.5 kg of granules of this polymer, mix them with an active additive, natural apatite, in an amount of 0.2 kg and with the composite compound in an amount of 0.3 kg.

TABLE 1

Optical properties of light-transforming materials, extruded into the film.

| Example | Matrix-forming component (polyethylene) wt. % | Active additive, wt. % | UV-light absorption range, nm | Quantum efficiency of conversion, % | Light-transparency of polymer covering at 580–700 nm, % | Stability of luminescent properties under solar radiation, days |
|---|---|---|---|---|---|---|
| 20 | 99.8 | Natural apatite - 0.1<br>$Y_{1.95}Eu_{0.1}(VO_4)_{1.5}(PO_4)_{0.5}$ - 0.1 | 280–400 | up to 85 | 82 | 650 |
| 21 | 99.6 | Natural apatite - 0.05<br>$Gd_{1.9}Eu_{0.1}(VO_4)_{1.2}(PO_4)_{0.8-0.35}$ | 280–400 | up to 86 | 84 | 650 |
| 22 | 99.7 | Natural apatite - 0.1<br>$La_{1.9}Eu_{0.1}(VO_4)(PO_4)$ - 0.2 | 280–400 | up to 82 | 83 | 650 |
| 23 | 99.5 | Natural apatite - 0.2<br>$Y_{1.95}Eu_{0.1}(VO_4)_2$ - 0.3 | 280–400 | up to 82 | 82 | 600 |
| 24 | 98.6 | Natural apatite - 0.7<br>$Y_{1.9}Eu_{0.1}(BO_3)(PO_4)$ - 0.7 | 280–400 | up to 83 | 83 | 650 |
| 25 | 99.89 | Natural apatite - 0.01<br>$Y_{1.9}Eu_{0.1}O_2S$ - 0.10 | 280–400 | 81 | 80 | 650 |
| 26 | 99.75 | Apatite, natural and synthetic - 0.075 of each $Y_{1.95}Eu_{0.05}O_2S$ - 0.10 | 280–400 | 83 | 83 | 650 |
| 27 | 99.7 | Apatite, natural and synthetic - 0.1 of each $Y_{1.9}Eu_{0.1}(BO_2)_2(WO_4)_2$ - 0.1 | 280–400 | up to 75 | 74 | 650 |
| 28 | 99.8 | Synthetic apatite - 0.1<br>$Y_{1.95}Eu_{0.05}(VO_4)_{1.5}(PO_4)_{0.5}$ - 0.1 | 280–400 | up to 85 | 85 | 650 |
| 29 | 99.6 | Synthetic apatite - 0.05<br>$Gd_{1.9}Eu_{0.1}(VO_4)_{1.2}(PO_4)_{0.8-0.35}$ | 280–400 | up to 86 | 86 | 650 |
| 30 | 99.7 | Synthetic apatite - 0.1<br>$La_{1.9}Eu_{0.1}(VO_4)(PO_4)$ - 0.2 | 280–400 | up to 82 | 84 | 650 |
| 31 | 99.5 | Synthetic apatite - 0.2<br>$Gd_{1.9}Y_{1.95}Eu_{0.05}(VO_4)_2$ - 0.3 | 280–400 | up to 82 | 85 | 600 |
| 32 | 98.6 | Synthetic apatite - 0.7<br>$Y_{1.9}Eu_{0.1}(BO_3)(PO_4)$ - 0.7 | 280–400 | up to 83 | 81 | 650 |
| 33 | 99.89 | Synthetic apatite - 0.01<br>$Y_{1.9}Eu_{0.1}O_2S$ - 0.10 | 280–400 | 82 | 83 | 650 |
| 34 | 99.75 | Synthetic apatite - 0.15<br>$Y_{1.95}Eu_{0.05}O_2S$ - 0.10 | 280–400 | 83 | 84 | 650 |
| 35 | 99.7 | Synthetic apatite - 0.2<br>$Y_{1.9}Eu_{0.1}(BO_2)_2(WO_4)_2$ - 0.1 | 280–400 | up to 75 | 79 | 650 |
| 36 | Known material, RU 2059999, Polyethylene - 99.5 | $La_{1.98}Eu_{0.02}OBr$ - 0.5 | 280–420 | up to 86 | 82 | 300 |

TABLE 2

Optical properties of light-transforming materials using different polymer basis.

| Example | Polymer basis, wt. % | Active additive, wt. % | Value of UV-light absorption by the material in the range of 300–400 nm, % | Value of conversion of absorbed UV-light, % | Light transparency of polymer covering in the range of 580–700 nm, % | Stability of luminescent properties under solar radiation, days |
|---|---|---|---|---|---|---|
| 37 | Polyethylene 99.35 | natural apatite - 0.45<br>$Y_{1.9}Eu_{0.1}(VO_4)_{1.5}(PO_4)_{0.5}$ - 0.15<br>$Y_{1.9}Sm_{0.1}(VO_4)_{1.5}(PO_4)_{0.5}$ - 0.05 | 78 | 74 | 73 | up to 650 |
| 38 | Polyethylene 99.79 | natural apatite - 0.1<br>$Y_{1.9}Eu_{0.1}(VO_4)_{1.2}(PO_4)_{0.8}$ - 0.1<br>$Y_{1.9}Tb_{0.1}(VO_4)_{1.2}(PO_4)_{0.8}$ - 0.01 | 81 | 72 | 74 | up to 650 |
| 39 | Copolymer of ethylene and inylacetate, 4% - 99.84 | natural apatite - 0.10<br>$Y_{1.9}Eu_{0.1}(VO_4)_{1.2}(PO_4)_{0.6}(BO_3)_{0.2}$ - 0.05<br>$Eu(TTA)_3(Phen)$ - 0.01 | 81 | 78 | 73 | up to 650 |
| 40 | Polyethylene-terephtalate (Russian equivalent of Dacron) - 99.80 | natural apatite - 0.05<br>$Y_{1.9}Eu_{0.1}(BO_3)(PO_4)$ - 0.05<br>$Eu_2(Ter)_3(Phen)_2$ - 0.1 | 78 | 76 | 77 | up to 650 |
| 41 | Polyethylene 99.35 | synthetic apatite - 0.45<br>$Y_{1.9}Eu_{0.1}(VO_4)_{1.5}(PO_4)_{0.5}$ - 0.15<br>$Y_{1.9}Sm_{0.1}(VO_4)_{1.5}(PO_4)_{0.5}$ - 0.05 | up to 82 | 73 | 77 | up to 650 |
| 42 | Polyethylene 99.79 | synthetic apatite - 0.1<br>$Y_{1.9}Eu_{0.1}(VO_4)_{1.2}(PO_4)_{0.8}$ - 0.1<br>$Y_{1.9}Tb_{0.1}(VO_4)_{1.2}(PO_4)_{0.8}$ - 0.01 | up to 85 | 72 | 74 | up to 650 |
| 43 | Copolymer of ethylene and vinyl acetate, 4% - 99.84 vinyl acetate | synthetic apatite - 0.10<br>$Y_{1.9}Eu_{0.1}(VO_4)_{1.2}(PO_4)_{0.6}(BO_3)_{0.2}$ - 0.05<br>$(DPhG)H[Eu(TTA)_4]$ - 0.01 | up to 83 | 80 | 74 | up to 650 |
| 44 | Polyethylene-terephtalate (Russian equivalent of Dacron) - 99.80 | synthetic apatite - 0.05<br>$Y_{1.9}Eu_{0.1}(BO_3)(PO_4)$ - 0.05<br>$Eu_2(Ter)_3(Phen)_2$ - 0.1 | up to 81 | 79 | 79 | up to 650 |
| 45 | Polymethyl-metacrylate - 99.55 | synthetic apatite - 0.3<br>$La_{0.95}Eu_{0.05}O_2S$ - 0.1<br>$Eu(TTA)_3(Phen)$ - 0.05 | 78 | 74 | 73 | up to 650 |

TABLE 3

Components of varnish compositions and optical properties of light-transforming materials on their bases.

| Example | Components of varnish compositions. | Matrix, thickness, nm | Value of UV-light absorption in the range of 220–400 nm, % | Value of UV-light conversion, % | Light-transparency of the material in the range of 580–700 nm |
|---|---|---|---|---|---|
| 46 | Acryl varnish - 97.6 natural apatite - 0.2<br>$Y_{1.9}Eu_{0.1}(VO_4)_{1.0}PO_4)_{0.7}(BO_3)_{0.3}$ - 2.0<br>$(DPhG)H[Eu(TTA)_4]$ - 0.2 | silicate glass, 4 MM<br>polycarbonate glass, 2 MM | 80<br>83 | 45–50<br>80 | 71<br>73 |
| 47 | Epoxy varnish - 99.5<br>natural apatite - 0.4<br>$Y_{1.9}Eu_{0.1}O_2S$ - 0.4<br>$(DPhG)H[Eu(HFAA)_4]$ - 0.1 | silicate glass, 4 MM<br>polymethylmetacrylate glass, 2 MM | 85<br>85 | 78<br>80 | 69<br>79 |
| 48 | 5% - aqueous solution of sodium silicate - 95.5<br>natural apatite - 4.0<br>$Y_{1.9}Eu_{0.1}(VO_4)_{1.2}(PO_4)_{0.8}$ | silicate glass, 4 MM | 79 | 77 | 66 |

The composition obtained was loaded in the mixer and thoroughly stirred, then the mixture was extruded into the film which was cut as into as thread fiber. Thread fiber obtained was then used for producing a light-transforming textile-like material using conventional methods.

The material obtained retains its light-transforming properties for 650 days.

Example 52.

For producing a light-transforming plate-like material containing borate-silicate glass as a matrix, use 98.0 kg of the composition used for producing silicate glass, add to it 0.3 kg of the mixture of natural and synthetic apatite in a 1:2 ratio, and 1.7 kg of composite compound.

The mixture obtained was put in the mixer, thoroughly stirred, and heated up to 1000° C. Glass plates were then formed in a usual way. The material obtained retains its light-transforming properties for 700 days.

The proposed light-transforming material in the form of light-transmission film was used to protect greenhouses and hothouses during cultivation of tomatoes, cucumbers, peppers, radishes, carrots, etc in different climatic zones.

Example 53.

This example is represented in Table 4 which shows the results of Calendula growth in the hothouse protected with different films including the proposed light-transforming material made as described in Example 20.

A standard polyethylene film without light-transforming properties was also used as a test film.

Example 54.

This example is represented in Table 5 which demonstrates the results of radish growth in the greenhouse protected with different films including a light-transforming material made as described in Example 20.

A standard polyethylene film without light-transforming properties is used as a test film.

TABLE 4

Productivity of Calendula growth in the hothouses protected with different polyethylene films

| Experiment | Total weight of leaves, g | Weight of leaves, g | Weight of shoots, g | Weight of roots, g | Amount of leaves, pieces |
|---|---|---|---|---|---|
| Open area | 32.1 ± 2.5 | 32.0 ± 1.3 | 15.3 ± 0.5 | 4.8 ± 0.1 | 6.0 ± 0.3 |
| Test film | 40.8 ± 2.1 | 22.0 ± 1.0 | 15.8 ± 0.3 | 3.0 ± 0.04 | 40.4 ± 2.3 |
| Light-transforming film | 102.9 ± 4.6 | 61.0 ± 3.5 | 36.2 ± 1.5 | 5.6 ± 0.1 | 92.0 ± 3.5 |

TABLE 5

Productivity or radish growth in the hothouse protected with different polyethylene films.

| Experiment | Amount of leaves, pieces | Weight of leaves, g | Weight of crops, g | Height of plants, sm |
|---|---|---|---|---|
| Open area | 8.3 ± 0.3 | 34.1 ± 0.8 | 34.4 ± 1.1 | 29.0 ± 2.1 |
| Test film | 7.54 ± 0.2 | 35.8 ± 0.9 | 40.9 ± 1.5 | 30.5 ± 2.3 |
| Light-transforming film | 6.0 ± 0.2 | 43.4 ± 1.0 | 55.9 ± 1.6 | 34.4 ± 0.5 |

Experimental results represented in Table 4, 5 show that the light-transforming material offered containing polyethylene film as a matrix is an efficient protection of hothouses.

Thus, using the present invention it is possible to prolong an action of light-transforming properties of the material to convert UV-radiation in the red radiation spectral range up to 650 days retaining the intensity of this transformation.

The present invention makes it possible to extend the arsenal of material suitable for the production of products with light-transforming properties.

Furthermore, having obtained the material containing a thermoplastic polymer as a matrix, the present invention can improve the heat-reflecting property of the material and enhance its strength.

Due to the enhancement of the strength of the material containing polymer film as a matrix, it is possible to produce a thin film of at least 4 μm. Thus, this material could be used not only for protection of hothouses and narrow beds but also for protection of agricultural crop in the field.

The present invention makes it possible to increase the intensity of UV radiation transformation into cyan and blue spectral range which according to our previous data increases productivity of plants by at least 5%.

Applicability

The present invention can be used in agriculture for the protection of hothouses, greenhouses and buildings for animals; in medicine it may be effective for preventing solar burns in humans and/or providing rapid adhesion thanks to the capability to reduce the dose of UV radiation; in light industry it may be applied for making a light-transforming cloth to be used for manufacturing sun roof hoods, awnings, clothes; in biotechnology it may be effective for the development of devices for the cultivation of microorganisms and cell cultures under transformation of the UV radiation into the red spectral range; in engineering it may be useful for manufacturing a light-transforming glass to glaze habitation and office buildings, greenhouses and buildings for animals as well as for manufacturing light-transforming glasses and automobile windows.

What is claimed is:

1. A light-transforming material comprising a matrix and an active additive capable of converting the UV-light into the orange-red spectral range; wherein the active additive is an apatite and at least one composite compound of europium (III) of the general formula $Me_x^m M_y^3 R_z^n$ or a mixture of said compound with at least one composite compound of samarium (III) or terbium (III) or gadolinium (III), with the general formula for each $$Me_x^m M_y^3 R_z^n$$

wherein $mx+3y=nz$;

$$Me_x^m = Me_{x'}^{m'} + Me_{x''}^{m''} + \ldots;$$

$$R_z^n = R_{z'}^{n'} + R_{z''}^{n''} + \ldots;$$

$$mx = m'x' + m''x'' + \ldots;$$

$$nz = n'z' + n''z'' + \ldots;$$

$x \geq 1.0 \geq y \geq 0.01$, where m and n are the charge of a Me or R ion, respectively, said active additive comprising at least two kinds of metal atoms; and Me represents a metal selected from the group consisting of yttrium, lanthanum, cerium, praseodymium, neodymium, samarium, europium, gadolinium, dysprosium, holmium, erbium, ytterbium, aluminum, bismuth, tin, titanium, manganese, calcium, barium, zinc, cadmium, sodium, potassium, rubidium, and cesium, M represents a metal selected from the group consisting of europium, samarium, terbium, and gadolinium;

R represents an element selected from the group consisting of oxygen, sulfur, fluorine, chlorine, bromine, phosphorus, boron, vanadium, molybdenum, tungsten, germanium, or compounds thereof.

2. The material according to claim 1, wherein an active additive is distributed inside or over the surface of the matrix.

3. The material according to claim 1, wherein an active additive is present in an amount of at least 0.02 wt. % of the material.

4. The material according to claim 1, wherein the matrix is light transparent.

5. The material according to claim 1, wherein apatite is natural or synthetic crystalline apatite in a finely divided condition corresponding to the formula $Ca_{10}(PO_4)_6R_2$, where R—F, CI, or OH, or is a mixture thereof.

6. The material according to claim 1, wherein composite compound is at least one compound wherein nz=3 and of the formula $Me_xM_yOGal$, Gal=F, Cl, Br, or nz=6 and of formula $Me_xM_yO_2Hal$, Hal=S or Se, or of the formula $Me_xM_yO_2S_{1\pm0.2}$ or wherein nz=6 and of the formula $Me_xM_y(VO_4)_2$, or of the formula $Me_xM_y(BO_3)_z(PO_4)_{z''}$, or of the formula $Me_xM_y(VO_4)_z(PO_4)_{z''}$, or of the formula $Me_xM_y(VO_4)_z(PO_4)_{z''}(BO_3)_{z''}$, or of the formula $Me_xM_y(BO_2)_{z'}(WO_4)_{z''}$, or $Me_xM_y(BO_2)_z(MoO_4)_{z''}$.

7. The material according to claim 6, wherein composite compound of the general formula $Me_xM_yOGal$ or $Me_xM_yO_2Hal$ is the product of processing of solid solutions of Me and M oxides' in a medium of alkaline halogens or chalcogenides at 800–1200° C.

8. The material according to claim 6, wherein composite compound of the general formula $Me_xM_yO_2S_{1\pm0.2}$ is the product of processing of Me and M oxides in sulfurous medium at 1200° C.

9. The material according to claim 6, wherein composite compound of the general formula $Me_xM_y(VO_4)_2$, is the product of interaction of the solid-phase Me and M oxides with ammonium vanadate at 900–1100° C.

10. The material according to claim 6, wherein composite compound of the general formula $Me_xM_y(BO_3)_z(PO_4)_{z''}$, is the product of interaction of the solid-phase Me and M oxides with boric acid and ammonium phosphate at 900–1100° C.

11. The material according to claim 6, wherein composite compound of the general formula $Me_xM_y(VO_4)_z(PO_4)_{z''}$, is the product of interaction of the solid-phase Me and M oxides with vanadate and ammonium phosphate at 1000–1200° C.

12. The material according to claim 6, wherein composite compound of the general formula $Me_xM_y(VO_4)_z(PO)_{z''}(BO_3)_{z''}$, is the product of interaction of the solid-phase Me and M oxides with vanadate and ammonium phosphate, and also boric acid at 800–1100° C.

13. The material according to claim 6, wherein composite compound of the general formula $Me_xM_y(BO_2)_z(WO_4)_{z''}$, or $Me_xM_y(BO_2)_z(MoO_4)_{z''}$, is the product of interaction of the solid-phase Me and M oxides, tungsten (molybdenum) with boric acid at 1100–1200° C.

14. The material according to claim 1, wherein the matrix is a film, a plate, textile, or non-fibrous or fibrous materials.

15. The material according to claim 14, wherein the matrix is a thermoplastic polymer.

16. The material according to claim 14, wherein the matrix is made of a soluble film-forming polymer of the type of polymethylmethacrylate, polybutylmethacrylate, polyvinyl chloride, polystyrene, polyethylene, or polyamide.

17. The material according to claim 14, wherein the matrix is made of a polymer selected from the group consisting of polymethyl methacrylate, polybutyl methacrylate, polycarbonate (PC), poly(ethylene terephthalate), or a polyolefin selected from the group consisting of polypropylene, polyvinyl chloride, polystyrene, polyethylene, or a polyamide; or copolymers of these polymers, or admixtures of these polymers.

18. The material according to claim 14, wherein the matrix is a natural or synthetic fiber or mixture thereof.

19. The material according to claim 14, wherein the matrix is a silicate glass.

20. The material according to claim 14, wherein the matrix is organic glass.

21. The material according to claim 1, wherein it contains in addition lacquer or adhesive.

22. The material according to claim 21, wherein the lacquer or adhesive is a silicone or polyester or polyepoxy or epoxy resin or mixture thereof.

23. The composition for producing a light-transforming material comprising a matrix-forming agent and an active additive, wherein an active additive is apatite and at least one composite compound of europium (III) of the general formula $Me_x^mEu_y^3R_z^n$, or admixture of said compound with at least one composite compound of either samarium (III), or terbium (III) or gadolinium (III), of the general formula for each:

$$Me_x^mM_y^3R_z^n,$$

wherein $mx+3y=nz;$

Me represents at least one metal from the group consisting of yttrium, lanthanum, cerium, praseodymium, neodymium, samarium, europium, gadolinium, dysprosium, holmium, erbium, ytterbium, aluminum, bismuth, tin, titanium, manganese, calcium, barium, zinc, cadmium, sodium, potassium, rubidium, and cesium;

M represents a metal selected from the group consisting of samarium, terbium, and gadolinium;

R represents at least one element selected from the group consisting of oxygen, sulfur, fluorine, chlorine, bromine, phosphorus, boron, vanadium, molybdenum, tungsten, and germanium; and the matrix-forming agent is either a thermoplastic or soluble polymer, a fibrous material or a composition for producing a glass or lacquer/adhesive-forming substance in the following proportions of the components (wt %):

| | |
|---|---|
| Apatite | 0.01–10.0 |
| Composite compound | 0.01–10.0 |
| Matrix-forming agent | the balance. |

24. The composition according to claim 23, wherein a matrix-forming agent is a polymer selected from the group consisting of polymethyl methacrylate, polybutyl methacrylate, polycarbonate (PC), poly(ethylene terephthalate), polypropylene, polyvinylchloride, polystyrene, polyethylene, polyamide, copolymers and admixtures.

25. The composition according to claim 23, wherein the matrix-forming agent is a silicone, polyester, polyepoxy, epoxy resin, or mixture thereof.

26. The composition according to claim 23, wherein a matrix-forming agent is natural fiber selected from the group consisting of silk, wool, cotton, hemp, and mixtures thereof.

27. The composition according to claim 23, wherein a matrix-forming agent is synthetic fiber selected from the group consisting of viscose, acetate, polyester, polyamide, polyacrylamide, mixtures thereof.

28. The composition according to claim 23, wherein a matrix-forming agent is a composition for producing a silicate glass.

29. The material according to claim 1, wherein the material comprises, in addition, at least one coordination compound of metal E selected from the group consisting of [E(TTA)$_3$(Phen)], [E(TTA)$_3$(TPhPO)$_2$], (DPhG)H[E(TTA)$_4$], (DPhG)H[E(HFAA)$_4$], [E(HFAA)$_3$(Phen)],

[E(HFAA)$_3$(TPhPO)$_2$], (DPhG)H[E(AA)$_4$], [E(AA)$_3$(Phen)], [E(BB)$_3$(Phen)], [E(TFA)$_3$(Phen)], (DPhG)H[E(TFA)$_4$], [E(Capr)$_3$(Phen)], [E$_2$(Ter)$_3$(Phen)$_2$] and [E(NO$_3$)$_3$(Phen)$_2$], wherein E represents a metal selected from the group consisting of europium, samarium terbium, and gadolinium;

H represents hydrogen ion; TTA represents thenoyltrifluoroacetonate-anion, HFAA represents hexafluoroacetylacetonate-anion, BB represents benzoylbenzoato-anion, AA represents acetylacetonato-anion, TFA represents trifluoroacetate-anion, Capr represents capronato-anion, Ter represents terephthalato-anion, Phen represents 1,10-phenantroline, TPhPO is triphenylphosphineoxide, and DPhG is diphenylguanidine.

30. The composition according to claim 23, wherein it contains, in addition, at least one coordination compound of metal E selected from the group consisting of [E(TTA)$_3$(Phen)], [E(TTA)$_3$(TPhPO)$_2$], [(DPhG)H[E(TTA)]$_4$] (DPhG)H[E(HFAA)$_4$], [E(HFAA)$_3$(Phen)], [E(HFAA)$_3$(TPhPO)$_2$], (DPhG)H[E(AA)$_4$], [E(AA)$_3$(Phen)], [E(BB)$_3$(Phen)], [E(TFA)$_3$(Phen)], (DPhG)H[E(TFA)$_4$], [E(Capr)$_3$(Phen)], [E$_2$(Ter)$_3$(Phen)$_2$] and [E(NO$_3$)$_3$(Phen)$_2$], wherein E represents a metal selected from the group consisting of europium, samarium, terbium, and gadolinium, H represents hydrogen ion; TTA represents the thenoyltrifluoroacetonato-anion, HFAA represents hexafluoroacetylacetonato-anion, BB represents benzoylbenzoato-anion, AA represents acetylacetonato-anion, TFA represents trifluoroacetato-anion, Capr represents capronato-anion, Ter represents terephtalato-anion, Phen represents 1,10-phenantroline, TPhPO represents triphenylphosphineoxide, and DPhG represents diphenylguanidine in the following proportions of the components (wt %):

| | |
|---|---|
| Apatite | 0.01–10.0 |
| Composite compound | 0.01–10.0 |
| Coordination compound | 0.01–1.00 |
| Matrix-forming agent | the balance. |

31. The material according to claim 30, wherein coordination compound of metal E is the product of transformation of europium (III), samarium (III), terbium (III) or gadolinium (III) nitrate by thenoyltrifluoroacetone, or hexafluoracetylacetone, or acetylacetone, or benzoylbenzoic, or trifluoroacetic, or caproic, or terephtalyc acid and 1,10-phenantroline, or triphenylphosphineoxide, or diphenylguanidine in aqueous-alcoholic medium at 80–90° C.

* * * * *